UNITED STATES PATENT OFFICE.

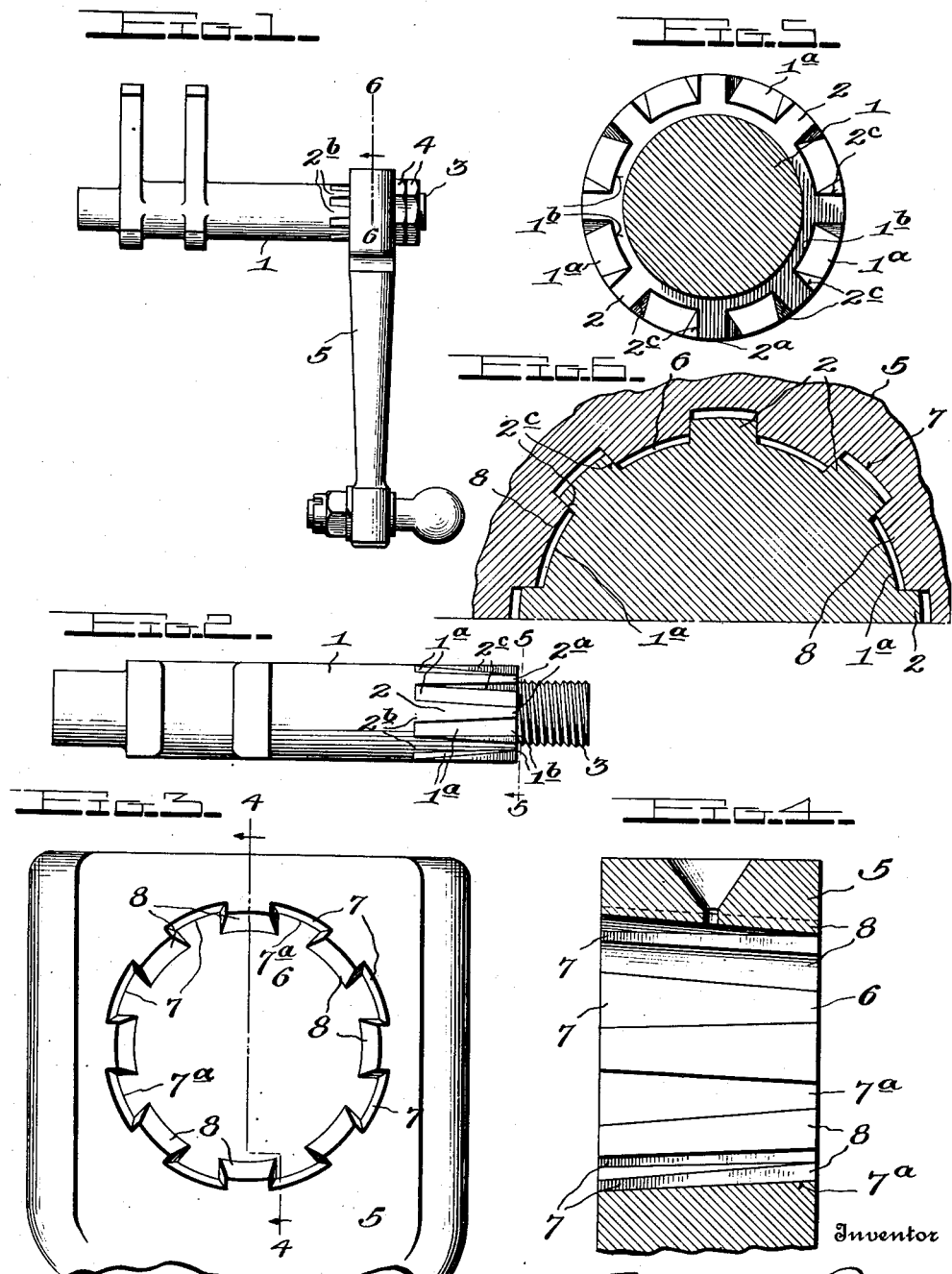

DAVID E. ROSS, OF LA FAYETTE, INDIANA, ASSIGNOR TO ROSS GEAR AND TOOL COMPANY, OF LA FAYETTE, INDIANA, A CORPORATION OF INDIANA.

STEERING ARM AND POST.

1,136,557. Specification of Letters Patent. Patented Apr. 20, 1915.

Application filed April 24, 1914. Serial No. 834,140.

*To all whom it may concern:*

Be it known that I, DAVID E. ROSS, a citizen of the United States, residing at La Fayette, in the county of Tippecanoe and State of Indiana, have invented certain new and useful Improvements in Steering Arms and Posts; and I hereby declare that the following is a full, clear, and exact description thereof, reference being had to the accompanying drawings, which form part of this specification.

This invention is a novel improvement in means for detachably fastening crank arms and the like to shafts, and is particularly designed for use in securing steering arms to the crank shafts of steering gears for automobiles and other vehicles.

The object of the invention is to provide a very simple and efficient connection whereby the crank can be detachably, but rigidly and non-rotatably, connected to the crank shaft; and any lost motion which may develop in the course of time between the arm and shaft may be quickly taken up.

In carrying out the invention the shaft is provided with parallel longitudinal tapered splines and the arm or crank with a tapered opening provided with a corresponding series of parallel tapered slots adapted to be engaged by the tapered splines on the shaft, the construction being such that there is a loose fit between the opposed peripheral surfaces or sides of the splines and the slots, and a wedging fit between the radially disposed faces of the splines and the slots; whereby the arm is fixedly locked against rotatorial motion on the shaft and any lost motion therebetween can be immediately compensated for by slightly shifting the arm longitudinally of the shaft.

I will explain the invention as applied to the crank shaft and arm of a vehicle steering gear, and have so illustrated it in the accompanying drawings; and the essential features and characteristics of the invention are summarized in the claims.

In said drawings:—Figure 1 is a side view of the crank shaft of a steering gear, and an arm attached thereto in accordance with my invention. Fig. 2 is an enlarged view of the crank shaft detached. Fig. 3 is an enlarged side face view of the steering arm detached. Fig. 4 is a detail longitudinal section on line 4—4, Fig. 3. Fig. 5 is an enlarged transverse section on line 5—5, Fig. 2. Fig. 6 is a transverse section on line 6—6, Fig. 1.

The invention is applicable to many well known types of steering gears, and also useful in many other places where it is desirable to attach a crank arm to a shaft so that there will be no lost motion between the parts, and so the arm will be non-rotatably attached to the shaft.

In the drawings the crank shaft is indicated at 1 and the crank arm at 5. In the end of the shaft 1 to which the arm is to be attached is formed a series of longitudinally disposed parallel grooves $1^a$, which grooves become shallower and narrower as they extend from the outer end of the shaft inward. These grooves form between them longitudinally disposed ribs or splines 2 which are widest at their inner ends and narrowest at their outer ends, as shown. Said splines are also thickest at their outer ends; and are approximately rectangular in cross section, as indicated at $2^c$. Adjacent the outer end of this splined portion the shaft is preferably reduced in diameter, as at 3, and externally threaded for the engagement of a nut or nuts 4 hereinafter referred to.

The crank or steering arm 5 has an opening 6 to receive the splined end of the shaft 1; this opening is preferably slightly conical, and larger at its inner end, so that it can be easily slipped upon the splined end of the shaft by introducing the latter into the larger end of the opening.

The opening 6 in the arm is provided with a series of longitudinal parallel slots 7 which practically correspond in position and in cross section to the splines 2 on the shaft, said slots being narrowest at their inner ends and deepest at their outer ends as indicated at $7^a$. These slots form between them longitudinal ribs 8 which substantially correspond in location and shape with the slots 2 in the shaft 1.

When the arm is properly placed upon the shaft as in Figs. 1 and 6 the splines 2 will engage the slots 7, and the slots $1^a$ in the shaft will also engage the corresponding ribs 8 in the opening. The construction is such however that the sides of the tapered splines 2 engage the opposed sides of the correspondingly tapered slots 7, as indicated in Fig. 6, before the outer or peripheral surfaces of the splines can engage the bottoms or peripheral surfaces of the opposed slots; and the shaft is thus centered in the opening and the arm mounted upon the shaft, and rigidly locked thereto, as shown in Fig. 6. In other words the shaft and arm are rigidly locked and centered by the engagement of the approximately radial sides of the tapered splines with the opposed approximately radial sides of the related slots in said arm and shaft before any of the circumferentially or peripherally opposed surfaces of the splines and slots can contact.

It will be seen by reference to Fig. 6 that the arm 5 is not supported on the shaft 1 by the engagement of opposed circumferential surfaces on the shaft and arm; and that there is no appreciable contact between the opposed circumferential faces of the splines and the opposed circumferential slots; but the arm is centered upon and locked to the shaft by reason of the engagement of the approximately radial faces or sides of the tapered splines with the opposed approximately radial faces or sides of the slots; and by moving the arm longitudinally of the shaft the opposed longitudinally beveled faces of the splines and slots will contact and lock the arm rigidly to the shaft.

The arm can be fastened on the shaft by means of nuts 4 and any lost motion or wear between the arm and shaft can be easily compensated for by tightening said nuts, so as to cause the close engagement of the lateral or approximately radial faces of the opposed tapered splines and slots.

What I claim is:

1. In combination a shaft having a circumferential series of longitudinally disposed tapered splines, and a member having an opening provided with a similar series of longitudinally disposed slots adapted to engage the splines, there being a loose fit between the opposed peripheral surfaces of the splines and slots and a wedging fit between both of the opposed side surfaces of the splines and slots, substantially as described.

2. In combination a shaft having a circumferential series of longitudinally disposed tapered splines, and a member having a tapered socket provided with a circumferential series of longitudinally disposed tapered slots adapted to engage the splines of the shaft, there being a loose fit between the opposed peripheral surfaces of the splines and slots and a wedging fit between both of the opposed side surfaces of the splines and slots, substantially as described.

3. In combination a shaft having a circumferential series of longitudinally disposed tapered splines, and a member having a tapered socket provided with a circumferential series of longitudinally disposed tapered slots adapted to engage the splines of the shaft; there being a loose fit between the opposed peripheral surfaces of the splines and slots and a wedging fit between both of the opposed side surfaces of the splines and slots; with means for preventing endwise movement of the member on the shaft when the slots are engaged.

4. In combination a shaft of uniform diameter having a circumferential series of longitudinally disposed splines formed by slotting the shaft, and a member having a tapered opening provided with a similar series of longitudinally disposed slots adapted to engage the splines, said splines and slots being so formed that both the approximately radially disposed side edges thereof engage and prevent the opposed peripheral surfaces thereof coming into contact.

5. In combination a shaft having a circumferential series of longitudinally disposed splines, a member having a tapered socket provided with a circumferential series of longitudinally disposed slots adapted to engage the splines of the shaft, said splines and slots being so formed that both the approximately radially disposed side edges thereof engage and the opposed peripheral surfaces thereof cannot contact.

6. In combination a shaft having a circumferential series of longitudinally disposed and tapered splines, a member having a tapered socket provided with a circumferential series of longitudinally disposed tapered slots adapted to engage the splines of the shaft, and means for preventing endwise movement of the member on the shaft when the slots are engaged, said splines and slots being so formed that both the approximately radially disposed side edges thereof engage and the opposed peripheral surfaces thereof cannot contact.

In testimony that I claim the foregoing as my own, I affix my signature in presence of two witnesses.

DAVID E. ROSS.

Witnesses:
A. L. Ross,
Edward A. Ross.